UNITED STATES PATENT OFFICE.

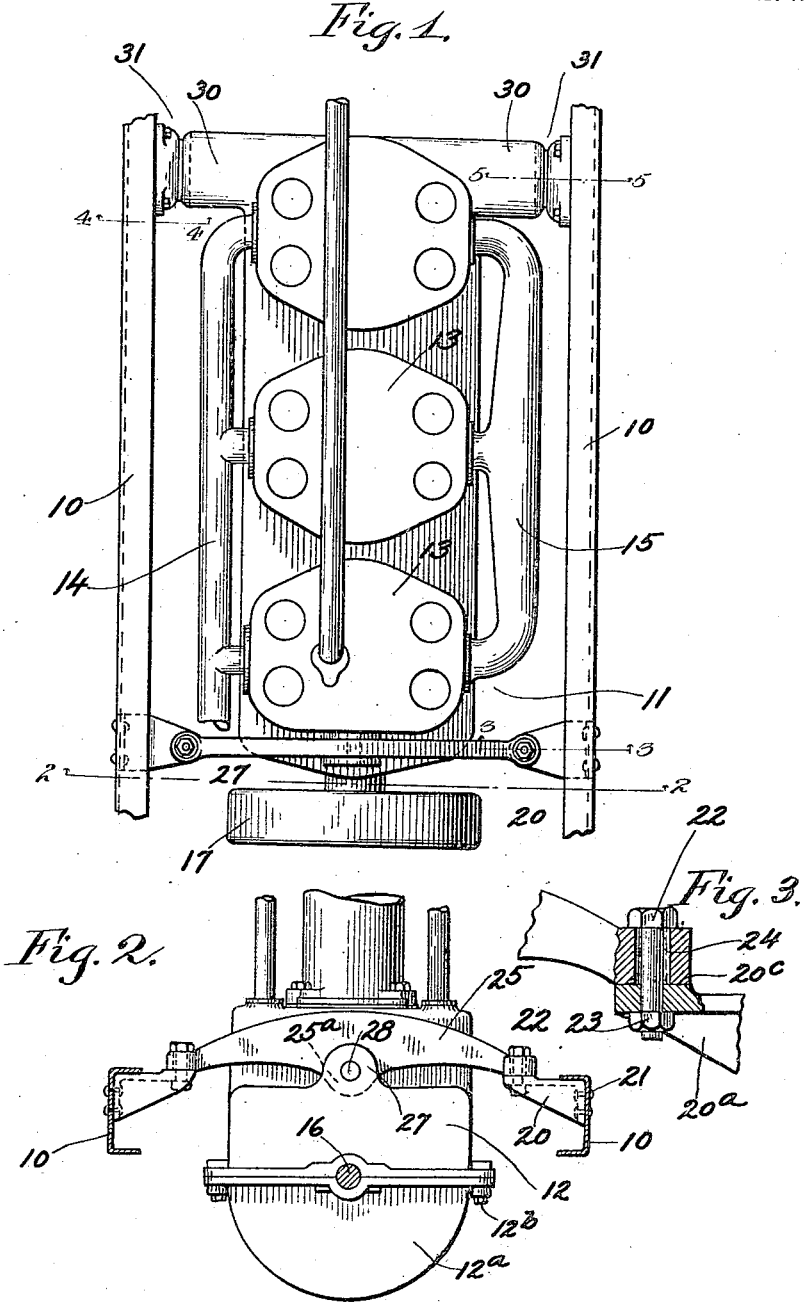

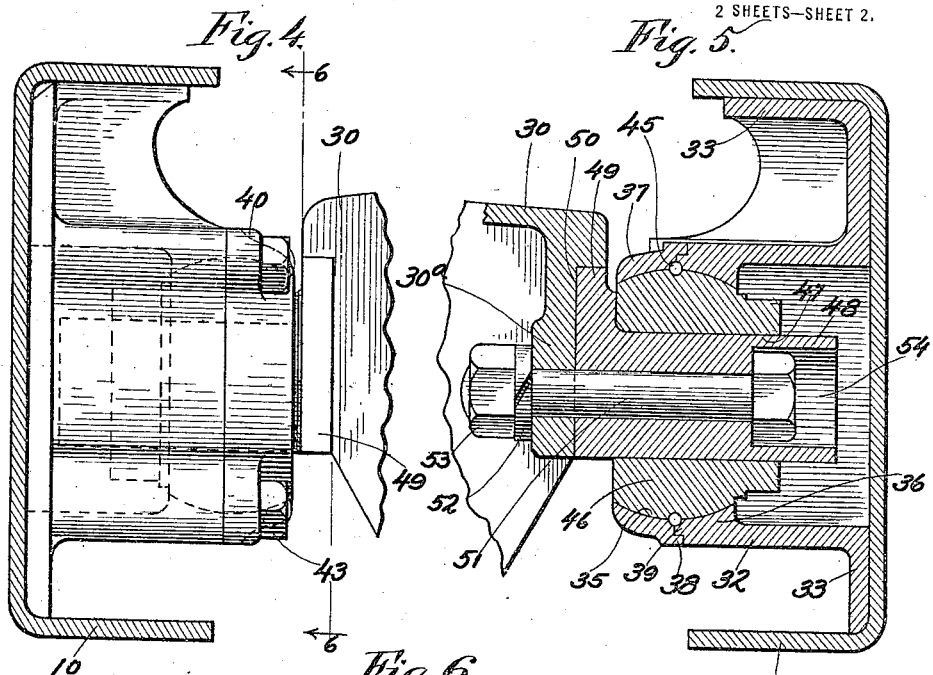

CHARLES ARTHUR TILT, OF CHICAGO, ILLINOIS.

AUTOMOBILE ENGINE SUSPENSION.

1,410,779.   Specification of Letters Patent.   Patented Mar. 28, 1922.

Application filed February 13, 1917. Serial No. 148,465.

*To all whom it may concern:*

Be it known that I, CHARLES ARTHUR TILT, a citizen of the United States, residing at Chicago, in the county of Cook and State of Illinois, have invented certain new and useful Improvements in Automobile Engine Suspensions, of which the following is a specification.

This invention relates to improved means for supporting an automobile engine on or suspending it from the frame of an automobile. Where the engine frame and crank case of an automobile are rigidly connected to the frame, the distortion of the frame, due to shocks and irregularities in the road when the automobile is in operation, is likely to set up strains in the engine frame which may cause undue friction in the bearings of the crank shaft or may crack the engine frame or crank case. The principal object of the present invention is to provide connections between the engine frame and the frame of the automobile which will permit sufficient relative movement of the chassis and the engine so that undue strains will not be set up in the engine frame by the distortion of the frame of the automobile. More particularly the invention provides an improved universal joint or connection between the engine and the frame so that a relative angular and sliding movement is permitted between the engine and the frame. A further feature is the provision of a three-point suspension of the engine on the frame comprising improved connecting means whereby the operation of the engine and the strains set up in the casing thereof are independent of any distortion of or strains in the automobile frame.

These and other objects of the invention will appear more clearly from the following specification taken in connection with the accompanying drawings in which one embodiment of the invention is illustrated.

In the drawings—

Figure 1 shows a top plan view of a portion of an automobile frame having an engine connected thereto by means of the present invention.

Fig. 2 is a sectional view taken on the line 2—2 of Fig. 1, looking in the direction of the arrows;

Fig. 3 is an enlarged detail view taken on the line 3—3 of Fig. 1;

Fig. 4 is a sectional view taken on the line 4—4 of Fig. 1, showing a side elevation of one of the universal joints;

Fig. 5 is a sectional view taken on the line 5—5 of Fig. 1, showing a vertical section through one of the universal joints; and Fig. 6 is a side elevation looking toward the side frame showing the various parts of the universal joint.

In the drawings the frame of the automobile is shown as comprising the usual side frame members 10 of channel form, having the flanges thereof directed inwardly, and supported on the side frame members is an engine 11 comprising the base or crank case 12 carrying the cylinders 13 to which the manifolds 14 and 15 are connected. The crank case 12 comprises a lower detachable part 12$^a$ connected to the upper part by the bolts 12$^b$, and this crank case is provided with bearings having journalled therein the engine shaft 16 carrying the fly-wheel 17. These parts do not in themselves form part of the present invention but are illustrated for the purpose of showing and describing the operation and combination therewith of the present improvements.

Each side frame 10 has secured thereto adjacent one end of the engine, preferably the forward end, a bracket 20 which is secured to the side frame by means of rivets 21 and which extends inwardly therefrom as shown particularly in Figs. 1 and 2, each bracket being provided with a downwardly extending reinforcing rib 20$^a$. The inner ends of the brackets 20 are provided with vertically extending apertures engaged by the bolts 22, whose threaded ends carry the nuts 23. The bolts 22 engage suitable apertures 24 in the ends of a supporting beam or arch 25, which extends transversely between the side frames and rests upon the bearings 20$^c$ formed on the upper sides of the brackets 20. The apertures 24 are made somewhat larger than the bolts 20 in order to permit a slight relative movement of the supporting member 25 with respect to the brackets when a sufficient strain is set up to overcome the frictional contact between the member 25 and the brackets which are normally held in tight engagement by the bolts 22 and nuts 23. The base of the engine is provided at the central part thereof above the shaft 16 with spaced apart upwardly directed ears 27, which are adapted to extend on opposite sides of the downward projections 25$^a$ of the member 25. A pivotal connection is formed between the ears 27 and the member 25 by means of the pin 28, so that the forward end of the engine is pivotally suspended from the supporting beam or arch 25 carried by the brackets 20.

The other end of the engine frame is provided with lateral arms or extensions 30, which are connected to the side frames 10 through the universal or ball-and-socket joints 31, shown in detail in Figs. 4, 5 and 6. Each of the joints 31 comprises a bracket 32 having flanges 33 which coact with the walls of the adjacent side frame 10 to which the bracket is secured by means of rivets 34. The inwardly projecting part of each bracket carries an annular bearing socket 35 having the contour of a portion of a sphere, this bearing being formed by an annular ring portion 36 formed on the body of the bracket 32 and by a detachable cap 37 having an annular flange 38 which fits over a complementary flange 39 formed on the ring 36. The part 36 has lugs 40 projecting therefrom, and the cap member 37 has corresponding lugs 41 which are secured to the lugs 40 by means of the studs 42 and nuts 43. An oil groove 45 is formed in the bearing socket 35 at the junction of the parts 36 and 37. Journalled in the socket member 35 is a ball member 46 having the contour of a portion of a sphere and adapted to coact with the walls of the socket member to form a universal or ball-and-socket joint for permitting a wide range of relative movement of the member 46 with respect to the bracket 32. The member 46 has a cylindrical bearing 47 extending transversely therethrough and having journalled therein the trunnion 48 which has formed thereon, at its inner end, a rectangular plate 49. This plate is adapted to fit into a rectangular socket 50 formed in the end of the adjacent extension 30 of the crank case, and the trunnion is secured to the part 30 by means of a bolt 51 extending through the trunnion and through the flange 30ª of the crank case to which it is secured by a washer 52 and nut 53. The outer end of the trunnion 48 is recessed, as shown at 54, to receive the head of the bolt 51. The trunnion mounted in this manner has a free sliding movement in the direction of its axis toward and away from the adjacent side frame 10, the parts being constructed to permit such a range of movement as will ordinarily occur in the practical operation of an automobile, while at the same time maintaining the proper extent of bearing surface between the trunnion and member 46. In addition to the sliding movement of the trunnion 48, the members 46 will have a free pivotal or oscillatory movement in the sockets 35 so that the frame of the engine can adjust itself readily to all of the distortions of the automobile frame which occur even under the most severe conditions of operation. While these ball-and-socket joints permit the necessary free movement of one end of the engine frame, the pivotal suspension of the other end on the supporting arch 25 will permit the necessary accommodation of all parts of the engine frame to the distortion or twisting of the automobile frame. When these stresses or strains occur at the forward end of the engine, the enlarged bolting apertures 24 in the member 25 will permit a limited sliding movement of the member 25 on the brackets 20, thus preventing breakage of any of the parts.

Although I have shown and described a particular embodiment of the invention for purposes of illustration, it will be understood that it may be constructed in various different forms without departing from the scope of the invention as defined in the appended claims.

What I claim is:

1. In combination a vehicle frame comprising side frame members, an engine, means for suspending one end of said engine from said side frame members, brackets secured to said side frame members adjacent the other end of said engine and extending inwardly therefrom, cap members to cooperate with said brackets, means for detachably securing said cap members to said brackets, said cap members and brackets having sockets of partially spherical contour formed therein, ball members mounted to oscillate in said sockets, and trunnions carried by said engine and rotatably and slidably engaging said ball members.

2. In combination, a vehicle frame comprising side frame members, an engine, means for supporting one end of said engine on said side frame members, brackets secured to said side frame members adjacent the other end of said engine and extending inwardly therefrom, cap members secured to said brackets, said cap members and brackets having sockets of partially spherical contour formed therein, ball members mounted to oscillate in said sockets, trunnions rotatably and slidably mounted in said ball members, plates carried by the ends of said trunnions, said engine having sockets to receive said plates, and means for securing said trunnions and said plates to said engine.

3. In combination, an engine, a vehicle frame comprising side frame members of channel form having their flanges directed inwardly, brackets secured within the channels of said side frame members, said brackets having recesses extending inwardly and closed at their outer ends by said frame members, the walls of said recesses adjacent their inner ends being partially spherical in form, ball members mounted to oscillate on said partially spherical walls, trunnions detachably secured to opposite sides of one end of said engine and slidably and rotatably engaging said ball members, and means for supporting the other end of said engine on said frame members.

4. In combination, an engine, a vehicle frame comprising side frame members of channel form having their flanges directed inwardly, brackets secured within the channels of said side frame members, said brackets having recesses extending inwardly and closed at their outer ends by said frame members, the walls of said recesses adjacent their inner ends being partially spherical in form, ball members mounted to oscillate on said partially spherical walls, trunnions rotatably and slidably engaging said ball members adjacent one end of said engine, the inner ends of said trunnions within the recesses of said brackets being provided with sockets, bolts having their heads seated in said sockets and passing through said trunnions to secure the same to said engine, and means for supporting the other end of said engine on said frame.

5. In combination, an engine, a vehicle frame comprising side frame members of channel form having their flanges directed inwardly, brackets secured within the channels of said side frame members, said brackets having recesses extending inwardly and closed at their outer ends by said frame members, the walls of said recesses adjacent their inner ends being partially spherical in form, ball members mounted to oscillate on said partially spherical walls, trunnions rotatably and slidably engaging said ball members adjacent one end of said engine, the inner ends of said trunnions within the recesses of said brackets being provided with sockets, bolts having their heads seated in said sockets and passing through said trunnions to secure the same to said engine, said engine and said trunnions being provided with coacting shoulders to prevent rotation of said trunnions about said bolts, and means for supporting the other end of said engine on said frame.

6. In combination, an engine, a vehicle frame comprising side frame members of channel form having their flanges directed inwardly, brackets having parts fitting between the flanges of said side frame members, means for securing said brackets to said side frame members, said brackets having recesses extending inwardly toward said channels, the walls of said recesses adjacent their inner ends being partially spherical in form, ball members mounted to oscillate on said partially spherical walls, trunnions rotatably and slidably engaging said ball members adjacent one end of said engine, the inner ends of said trunnions within said recesses being provided with sockets, bolts having their heads seated in said sockets and passing through said trunnions to secure the same to said engine, said engine and said trunnions being provided with coacting shoulders to prevent rotation of said trunnions about said bolts, and means for supporting the other end of said engine on said frame.

7. In combination a vehicle frame comprising side frame members, an engine, means for suspending one end of said engine from said side frame members, brackets secured to said side frame members adjacent the other end of said engine and extending inwardly therefrom, said brackets having sockets of partially spherical contour formed therein, ball members mounted to oscillate in said sockets, and trunnions carried by said engine and rotatably and slidably engaging said ball members.

8. In the mounting of power plants for motor vehicles, and wherein the power plant is supported by and between longitudinal members of the chassis, means connecting the forward portion of the plant with such members, and means for supporting the rear portion of the plant from said members, said supporting means including a ball-like element carried by each longitudinal member with each element having a diametrically extending opening, and a bearing stud for each of said elements, said studs being carried by the plant and projecting from opposite sides thereof into said openings, the relative positions of the studs and elements being such as to permit relative movement between the plant and the members in a substantially horizontal direction lateral to the direction of the length of such members.

In testimony whereof, I have subscribed my name.

CHARLES ARTHUR TILT.